(12) United States Patent
Kompella et al.

(10) Patent No.: US 7,512,080 B1
(45) Date of Patent: Mar. 31, 2009

(54) FORWARDING TREE HAVING MULTIPLE BIT AND INTERMEDIATE BIT PATTERN COMPARISONS

(75) Inventors: Kireeti Kompella, Los Altos, CA (US); Jean Marc Frailong, Palo Alto, CA (US); Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 600 days.

(21) Appl. No.: 11/305,847

(22) Filed: Dec. 16, 2005

Related U.S. Application Data (60) Provisional application No. 60/734,379, filed on Nov. 8, 2005.

(51) Int. Cl.
*H04L 12/28* (2006.01)
*H04L 12/56* (2006.01)

(52) U.S. Cl. ................. 370/254; 370/255; 370/256; 370/408

(58) Field of Classification Search ............. 370/389, 370/392, 400, 428, 408, 429, 422, 401, 254, 370/255, 256
See application file for complete search history.

(56) References Cited

U.S. PATENT DOCUMENTS

| | | | |
|---|---|---|---|
| 5,909,440 A | 6/1999 | Ferguson et al. | |
| 6,067,574 A * | 5/2000 | Tzeng | 709/247 |
| 6,553,002 B1 * | 4/2003 | Bremer et al. | 370/254 |
| 6,618,760 B1 | 9/2003 | Aramaki et al. | |
| 6,857,026 B1 | 2/2005 | Cain | |
| 2004/0205229 A1 * | 10/2004 | Stojancic | 709/236 |

OTHER PUBLICATIONS

U.S. Appl. No. 10/045,717, entitled "Network Routing Using Indirect Next Hop Data," filed Oct. 19, 2001.

* cited by examiner

*Primary Examiner*—Chirag G Shah
*Assistant Examiner*—Ashley L Shivers
(74) *Attorney, Agent, or Firm*—Shumarker & Sieffert, P.A.

(57) ABSTRACT

Principles of the invention are directed to techniques for allowing a router forwarding packets within a computer network to perform two or more forwarding tree decisions per memory access. The router may implement forwarding information in the form of a radix tree having a number of nodes, and received packets may contain keys identifying a packet destination. The router may traverse the tree by testing two or more path control bits within the key per each of the traversed nodes. The values of the path control bits in the key determine the path traversed along the tree. The router also stores intermediate bit patterns at each node and tests intermediate bits in the key to determine whether a particular node is the best match to the routing prefix contained in the key, thereby eliminating a need to backtrack up the tree.

34 Claims, 6 Drawing Sheets

FORWARDING TREE HAVING MULTIPLE BIT AND INTERMEDIATE BIT PATTERN COMPARISONS

This application claims the benefit of U.S. provisional application Ser. No. 60/734,379, filed Nov. 8, 2005, the entire content of which is incorporated herein by reference.

TECHNICAL FIELD

The invention relates to computer networks and, more particularly, to techniques for routing packets within computer networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Upon receiving an incoming packet, the router examines information within the packet to identify the destination for the packet. Based on the destination, the router forwards the packet in accordance with the routing information.

Conventional routers often maintain the routing information in the form of one or more routing tables. The routing tables stores routes through the network, and generally represent the topology of the network. The form and contents of the routing tables often depend on the routing algorithm implemented by the router. Common routing algorithms include distance vector routing algorithms, path vector routing algorithms and link-state routing algorithms. Many of these algorithms make use of the concept of a "hop," which refers to a connection between two devices. Consequently, the distance between two devices is often measured in hops. Furthermore, in reference to routing a packet, the "next hop" from a network router typically refers to a neighboring device along a given route.

Many high-speed routers include routing engines that generate forwarding information in accordance with the routing information. In particular, the routing engine processes the routing information and other information (such as an access control list or packet processing policy) to select routes to each destination. Based on the selection process, the routing engine generates an action for each destination. This action could be to forward the packet according to forwarding information that associates destinations with specific next hops and ultimately to output ports of the router. Other examples of actions include dropping the packet, counting or logging the packet, or sending the packet to multiple destinations, or combinations of such actions. The term "next hop action" will refer in general to any forwarding decision made on a packet.

Routers commonly implement the forwarding information in the tree-like structure, such as a radix tree having a number of nodes. Upon receiving a packet, a forwarding component of the router uses the forwarding information to select a next hop and output port to which a packet will be forwarded. For example, the forwarding component traverses the nodes of the forwarding tree until reaching a leaf node to make a forwarding decision. Each node within the forwarding tree typically defines a single bit comparison. For example, each node may define a test for a specific bit of a destination "key" read from the packet. Based on the results of each comparison, the router selects another node of the forwarding tree, thereby traversing the tree until a leaf node is reached. The bits tested are referred to as path control bits; the values of the path control bits determine a path through the forwarding tree by a sequence of forwarding tree decisions. The end node of this path determines the next hop action, i.e., the packet forwarding decision.

Depending on the particular deployment of a router, the routing information maintained by the router may define hundreds of thousands of routes and millions of destinations. As result, the forwarding tree may be of considerable size and may contain millions of leaf nodes. Access to the forwarding tree may be costly, as the forwarding tree is typically stored in memory. Each memory access, i.e., access to a different node or set of nodes, introduces delay in forwarding the packet. As a high-speed router seeks to forward millions of packets per second, any delay during the forwarding process can significantly impact the performance of the router.

SUMMARY

In general, principles of the invention are directed to techniques for forwarding packets within a computer network. In particular, a router is described that generates and utilizes a new form of forwarding tree. The nodes of the forwarding tree include additional information that allows the router to perform multiple forwarding decisions per node. For example, the nodes store information defining multiple bit tests for the packet key.

As a result, according to the principles of the invention, the router may traverse the tree by testing two or more bits within the key per each of the traversed nodes. The values of the bits in the key determine the path traversed along the tree. The techniques allow the router to perform two or more forwarding tree decisions per memory access. Thus, by testing more than one bit per node, the techniques reduce any delay introduced by the memory access, and the router may route packets more efficiently.

Moreover, the nodes may further define one or more patterns for use in testing intermediate bits in the key at each node to determine whether a particular node is the best match to the routing prefix contained in the key, or whether the router may find a better match by continuing to traverse the forwarding tree. In other words, by testing the intermediate bits for specific patterns specific at each node, the router is able to determine whether or not continual traversal of the tree will result in an improved forwarding decision. If the intermediate bits do not match the pattern specified within the current node of the forwarding tree, the router may stop traversing the forwarding tree, and may forward a packet according to forwarding next hop data attached to the current internal node. In this manner, the router avoids traversing the entire forwarding tree until a leaf node is reached, and may avoid any potential backtracking in the forwarding tree that is common within conventional routers.

In one embodiment, a method comprises identifying a key within a network packet, traversing nodes of a forwarding tree within a network device by testing two or more path control bits within the key per each of the traversed nodes, wherein values of the two or more path control bits in the key determine a path traversed along the tree, and taking an action on the packet based on next hop data associated with an end node of the traversed path.

In another embodiment, a device comprises an input port for receiving a network packet containing a key, a packet-forwarding engine that traverses nodes of a forwarding tree within a network device by testing two or more path control bits in the key per each of the traversed nodes, wherein values of the two or more path control bits in the key determine a path traversed along the tree, and one or more output ports for forwarding the packet according to a forwarding next hop associated with an end node of the traversed path.

In another embodiment, a computer-readable medium comprises instructions for causing a programmable processor to identify a key within a network packet, traverse nodes of a forwarding tree within a network device by testing two or more path control bits within the key per each of the traversed nodes, wherein values of the two or more path control bits in the key determine a path traversed along the tree, and forward the packet according to a forwarding next hop associated with an end node of the traversed path.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
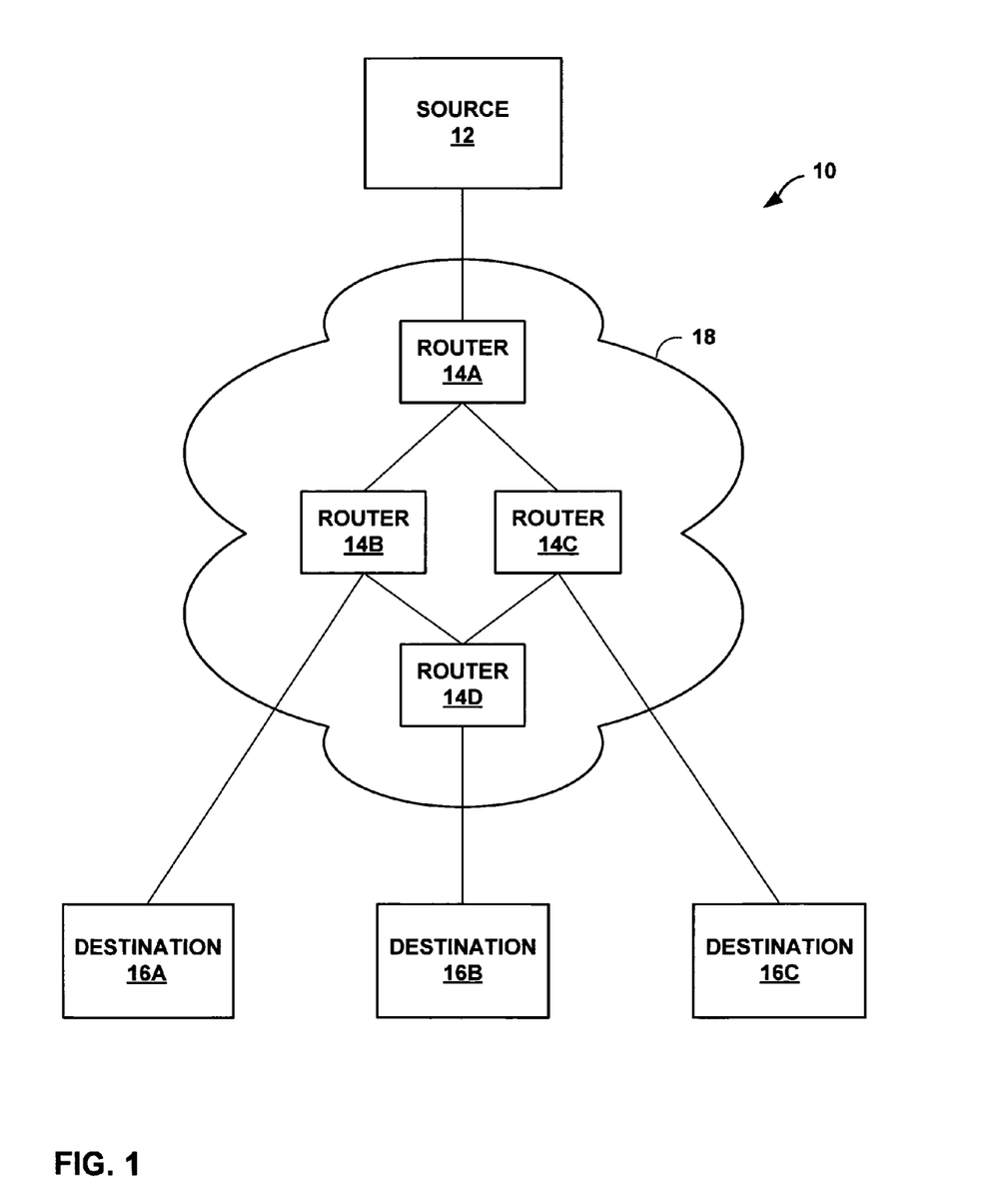
FIG. 1 is a block diagram illustrating an example network environment in which a source is connected to one or more routers for transmitting packets to one or more destinations consistent with the principles of the invention.

FIG. 1 is a block diagram illustrating an example network environment 10 in which a source 12 is connected to one or more routers 14A-14D (collectively, routers 14) for transmitting packets across network 18 to one or more destinations 16A-16C (collectively, destinations 16). Each of routers 14 includes a plurality of ports that are connected to various sources and destinations. Accordingly, a packet from source 12 may pass through more than one of routers 14 prior to arriving at the appropriate one of destinations 16.

For example, router 14A may receive packets from source 12 destined for destination 16C. Upon receiving a packet, router 14A forwards the packets to a next hop, i.e., a neighboring device along a given route to destination 16C.

Router 14A maintains forwarding information (not shown) used to determine the particular next hop to which a given packet will be forwarded. Router 14A may implement the forwarding information in the form of a radix tree having a number of nodes.

Upon receiving a packet, router 14A extracts a "key," which comprises a series of bits that identify a destination or a destination prefix for the packet. Alternatively, the key may represent a label or other form of information sufficient for forwarding the packet along a path, e.g., a multi-protocol label switched path. Using the key, router 14A traverses the nodes of the forwarding tree to reach an end node in a path through the tree to make a packet forwarding decision. As described herein, the end node for the traversal path need not be a leaf node of the tree. In other words, the traversal path may terminate within an internal node of the forwarding tree, and the information within that internal node is sufficient to determine a next hop for the packet.

More specifically, the nodes of the forwarding tree include data that specifies multiple "path control bits" that allows router 14A to perform multiple forwarding tree decisions per node. In other words, according to the principles of the invention, router 14A traverses the tree by testing two or more bits within the key per each of the traversed nodes based on the path control bits specified by that node. The actual values of the corresponding bits in the key determine the path traversed along the tree. The techniques allow the router to perform two or more forwarding tree decisions per memory access. Thus, by defining multiple path control bits per node, the techniques reduce delay introduced by the memory access, and the router may route packets more efficiently.

Moreover, the nodes may further define one or more bit patterns for use in testing intermediate bits in the key at each node to determine whether a particular node is the best match to the routing prefix contained in the key, or whether the router may find a better match by continuing to traverse the forwarding tree. In other words, by testing the intermediate bits for specific patterns specific at each node, the router is able to determine whether or not continual traversal of the tree will result in an improved packet forwarding decision. For example, a particular node may require that the router test bit four and either bits eight or ten of the key. In addition, the node may define particular patterns for comparison with intermediate bits 1-3, 5-7, and 9 of the key.

If the intermediate bits of the key do not match the pattern specified within the current node of the forwarding tree, the router may stop traversing the forwarding tree, and may forward a packet according to next hop data attached to the current internal node. In this manner, the router avoids traversing the entire forwarding tree until a leaf node is reached, and may avoid any potential backtracking in the forwarding tree that is common within conventional routers. This may further increase the efficiency of router 14A, since avoiding backtracking may reduce the amount of memory accesses required.

Although described above with respect to router 14A for exemplary purposes, the principles of the invention may be applied to any of routers 14. In other words, the principles of the invention may be readily applied to edge routers, core routers, label switching routers, routers within enterprise networks, or other forms of routing devices. Further, embodiments of the invention may be incorporated into other devices, such as firewalls, session border controllers, virtual private network (VPN) devices or other devices that may be configured to incorporate packet-forwarding functionality.

Moreover, although described with respect to routers, the principles of the invention may be applied to any switching device that forwards data. For example, the techniques may be applied to devices that forward data frames, cells (e.g., ATM cells) or other data units. Consequently, the term "packet" is used herein to refer to any form of data unit that may be forwarded through a computing network.

Figure 2:
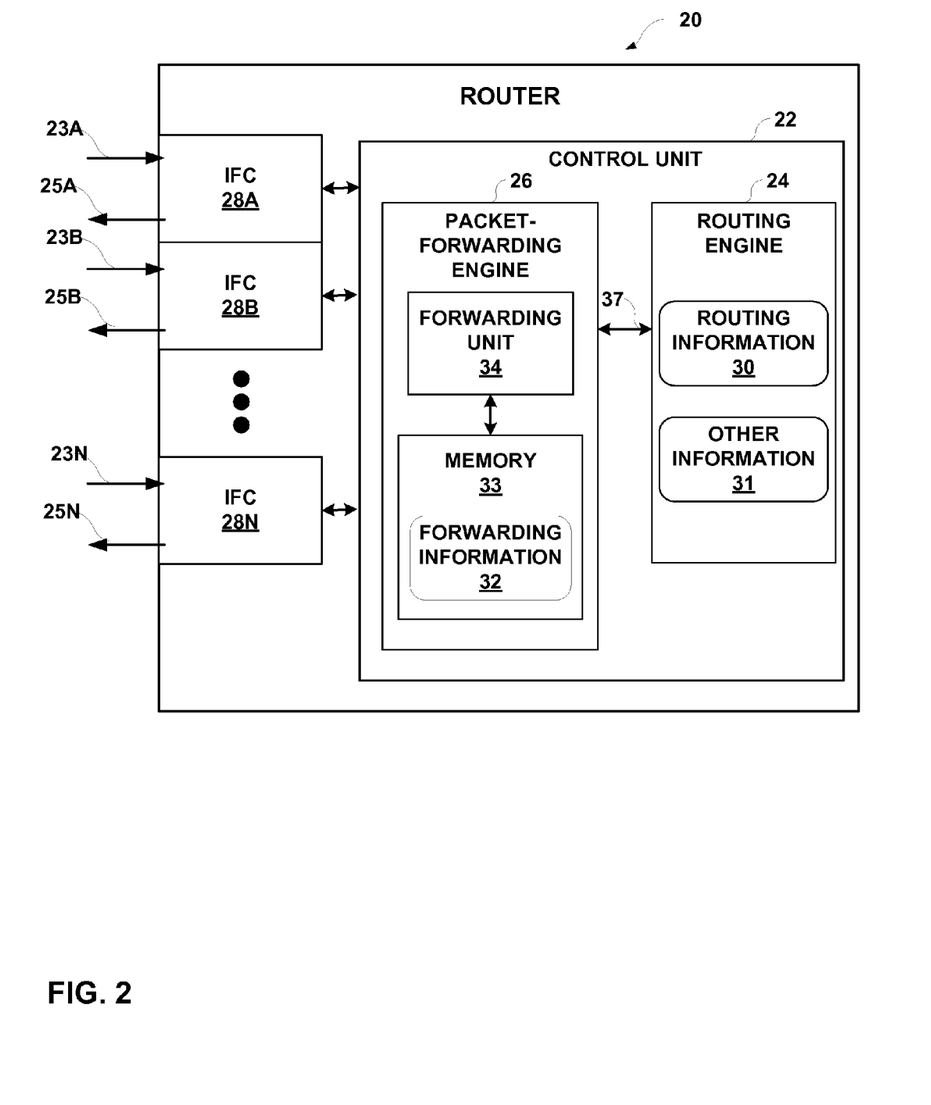
FIG. 2 is a block diagram illustrating an example router configured consistent with the principles of the invention.

FIG. 2 is a block diagram illustrating an example embodiment of a router 20 consistent with the principles of the invention. Router 20 includes a control unit 22 that directs inbound packets received from inbound link 23A-23N to the appropriate outbound link 25A-25N. In this example, the functionality of control unit 22 has been divided between a routing engine 24 and a packet-forwarding engine 26.

Routing engine 24 is primarily responsible for maintaining routing information 30 to reflect the current network topology, as well as other information 31 obtained by configuration or policy updates. In accordance with routing information 30 and other information 31, packet-forwarding engine 26 may maintain a memory 33 containing forwarding information 32 that associates destination information, such as Internet Protocol (IP) address prefixes, with specific next hops and corresponding interface ports of interface cards (IFCs) 28A-28N (collectively, IFCs 28). Forwarding information 32 may, therefore, be thought of as a distillation of the information contained within routing information 30 and other information 31.

Upon receiving an inbound packet, packet-forwarding engine 26 directs the inbound packet to an appropriate IFC 28 for transmission based on forwarding information 32. In particular, packet-forwarding engine 26 identifies and reads a key from the packet. The key includes destination information, such as information identifying a particular network destination (e.g., IP address), a destination prefix, or other form of destination information.

Thereafter, packet-forwarding engine 26 performs a search of forwarding information 32 for the best variable length match of the key. More specifically, forwarding unit 34 reads a portion of forwarding information 32 from memory 33 for testing portions of the key. Forwarding information 32 may be in the form of a radix tree having a number of nodes, and forwarding unit 34 may, for example, access memory 33 to read one or more nodes of the forwarding information. Forwarding unit 32 may, for example, load the nodes into one or more internal registers for purposes of testing the key.

In general, forwarding unit 34 may maintain forwarding information 32 as a tree-like data structure for use in locating the best matching route for a given key, i.e., the longest bit match relative to the key. In other embodiments, forwarding information 32 may be arranged, for example, as a number of tables, link lists, and other data structures that store pointers to forwarding next hops. At the completion of the tree search, forwarding unit 34 returns next hop data corresponding to the destination; this may include a result that specifies one of outbound links 25 associated with a next hop along a selected route to the destination. The process of the tree-based search will be discussed in further detail below with respect to FIGS. 5 and 6.

In one embodiment, each of packet-forwarding engine 26 and routing engine 24 may comprise one or more dedicated processors, hardware, and the like, and may be communicatively coupled by data communication channel 37. Data communication channel 37 may be a high-speed network connection, bus, shared-memory or other data communication mechanism. Packet-forwarding engine 26 may include computer-readable media (e.g., static or dynamic memory, magnetic memory, Flash memory or the like) capable of storing instructions for performing the functions described herein.

Furthermore, the architecture of router 20 illustrated in FIG. 2 is for exemplary purposes only. The invention is not limited to this architecture. In other embodiments, router 20 may be configured in a variety of ways. In one embodiment, for example, forwarding engine 26, routing engine 24, or both, may be replicated and incorporated directly within IFCs 28. In another embodiment, forwarding engine 26 and routing engine 24 may be combined into a single unit.

Figure 3:
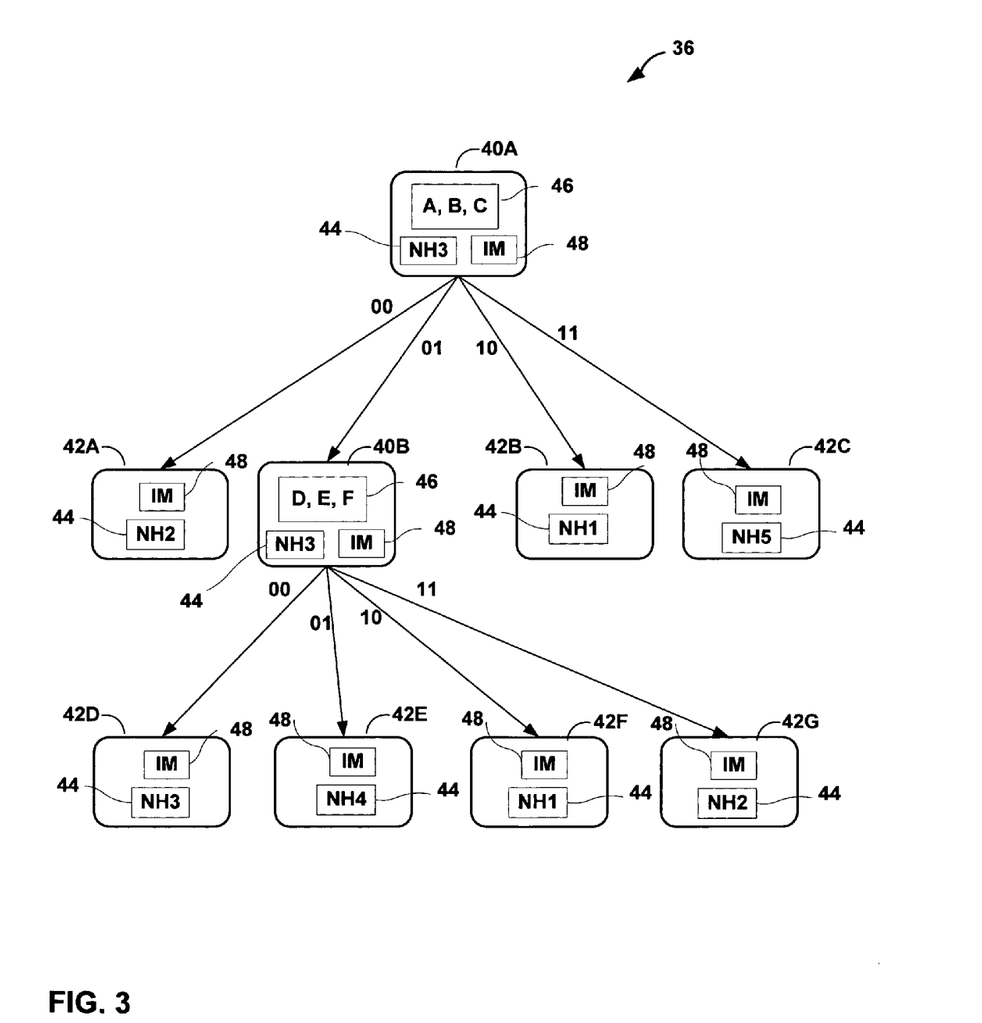
FIG. 3 is a block diagram illustrating example data structures for one arrangement of forwarding information consistent with the principles of the invention.

FIG. 3 is a block diagram illustrating example data structures for one arrangement of forwarding information 32. In the illustrated embodiment, forwarding information 32 is arranged as a radix tree 36 that maps network addresses to next hop data 44. More specifically, radix tree 36 includes a number of internal nodes 40A-40B (collectively, internal nodes 40) and leaf nodes 42A-42G (collectively, leaf nodes 42).

Internal nodes 40 represents nodes having at least one child node, while leaf nodes 42 represent nodes having no child nodes. Each of leaf nodes 42 provides a guaranteed end node for a traversal path through forwarding information 32, and each leaf node stores next hop data 44 defining a next hop, such as next hops 1-5 (NH1-NH5). However, as further illustrated below, traversal paths may terminate on internal nodes 40, depending on the best match of forwarding tree 36 for a particular packet key. Consequently, internal nodes 40 may also store next hop data 44.

For large networks, radix tree 36 can become sizable and may easily include hundreds of thousands or even millions of leaf nodes 42. Consequently, for exemplary purposes, FIG. 3 depicts a simplified version of radix tree 36. The arrangement of forwarding information 32 as a radix tree is illustrated for exemplary purposes. The principles of invention may readily be applied to other arrangements. Forwarding information 32 may be arranged, for example, as a number of tables, link lists, and other data structures that store pointers to next hop data 44.

Upon receiving an inbound packet, packet-forwarding engine 26 (FIG. 2) reads a block of data corresponding to the packet, referred to as the "key," that includes a network destination. The key may, for example, contain a routing prefix for another router or gateway within a network. Packet-forwarding engine 26 resolves the key to one of internal nodes 40 or leaf nodes 42 by traversing a path through radix tree 36.

A node of the forwarding tree includes multiple path control bits 46 that allow router 14A to perform multiple forwarding decisions per node. In other words, according to the principles of the invention, packet-forwarding engine 26 traverses tree 36 by testing two or more path control bits 46 within the key per each of the traversed internal nodes 40 based on the path control bits 46 specified by that node. In one embodiment, each of the traversed nodes specifies a primary path control bit, and at least two secondary path control bits. The nodes specify the primary path control bit and the secondary path control bits in accordance with a hierarchy defined by the forwarding tree, and the value of each of the tested bits determines the subsequent secondary bit to test along the hierarchy.

In this example, packet-forwarding engine 26 traverses radix tree 36 by testing two or more of path control bits A, B, C, D, E and F, which represent any bits within the key. In one embodiment, an internal node 40 may define a primary path control bit and one or more secondary path control bits. For example, internal node 40A defines a primary path control bit A and two secondary path control bits B and C. When processing node 40A, packet-forwarding engine 26 tests the primary path control bit A of the key. Based on whether bit A is a 1 or a 0, packet-forwarding engine tests secondary path control bit B or C for determination of the traversal path. As one example, the following table illustrates path selection of node 42A, 40B, 42B or 42C based on path control bits A, B and C, where "PCB" abbreviates Path Control Bit and "X" indicates that the corresponding bit value does not affect path selection:

TABLE 1

| PCB A | PCB B | PCB C | NEXT NODE |
|---|---|---|---|
| 0 | 0 | X | NODE 42A |
| 0 | 1 | X | NODE 40B |
| 1 | X | 0 | NODE 42B |
| 1 | X | 1 | NODE 42C |

The bits of a key may be numbered from a most-significant bit to a least-significant bit, e.g., left to right, and path control bits 46 may be any bits within the key. Based on the value of each path control bit 46, packet-forwarding engine 26 follows the links of radix tree 36 through the various levels until reaching an end node (i.e., either one of internal nodes 40 or one of leaf nodes 42) that terminate the traversal path. As described further below, path control bits 46 control the traversal path, while intermediate bit patterns (IM) 48 is used to test other bits of the key for certain patterns, thereby allowing packet-forwarding engine 26 to determine whether to terminate the traversal path prior to reaching a leaf node 42.

In the example of FIG. 3, the leaf nodes 42 store next hop data 44 that indicates an address of a next hop. In another embodiment, leaf nodes 42 may include a pointer that references a separate data structure such an array storing next hop data. The pointer may be indirect next hop data as described in "Network Routing Using Indirect Next Hop Data," U.S. application Ser. No. 10/045,717, filed Oct. 19, 2001, the entire content of which is incorporated herein by reference. In the embodiment shown in FIG. 3, each internal node 40 also includes next hop data 44 for a key matching the bits up to the internal node 40.

In addition to defining a set of path control bits 46 that are used to control the traversal path through forwarding tree 36, each intermediate node 40 and leaf node 42 may also store intermediate bit patterns (IM) 48 for use in testing intermediate bits of the key for certain patterns. For example, assume node 40A specifies path control bits 46 (A, B, C) of bit four and either bits eight or ten for use in testing the key. In this example, node 40A may define a primary intermediate bit pattern for comparison with intermediate bits 1-3 of the key, and secondary bit patterns for comparison with either bits 5-7 or bits 5-9 of the key for determination of whether to terminate the path traversal.

At each traversed internal node 40, packet-forwarding engine 26 tests the specified intermediate bits of the key for equality with intermediate bit patterns 48 stored in the internal node 40, to determine whether the intermediate bits of the key exactly match the intermediate bit patterns 48 stored within the node. The patterns stored in each of the traversed internal nodes 40 represent at least a portion of the key, such as a routing prefix. If the bits of the key match the specific pattern, packet-forwarding engine 26 continues traversing radix tree 36 as a "better" (i.e., more accurate) forwarding selection will be found within lower nodes 40, 42 of the tree. Failure to match provides an indication that a more accurate forwarding selection will not be found by further traversal. Thus, if the corresponding intermediate bits of the key do not match the stored bit pattern, packet forwarding engine 26 ceases traversing radix tree 36, and selects the attached next hop data 44 stored within the internal node 40 as the best match. In this way, the next hop data 44 provides a default path in the event no better (i.e., longer) match is located in tree 36 for a particular key.

Upon resolving a key of an inbound packet to one of internal nodes 40 or leaf nodes 42, packet-forwarding engine 26 reads the next hop data 44 from the node. Upon resolving the key to a particular next hop, packet-forwarding engine 26 determines the appropriate forwarding action, for example, determines an interface port associated with the next hop, in which case packet-forwarding engine 26 forwards the inbound packet to the appropriate IFC 28 for transmission via one of outbound links 25.

Figure 4A:
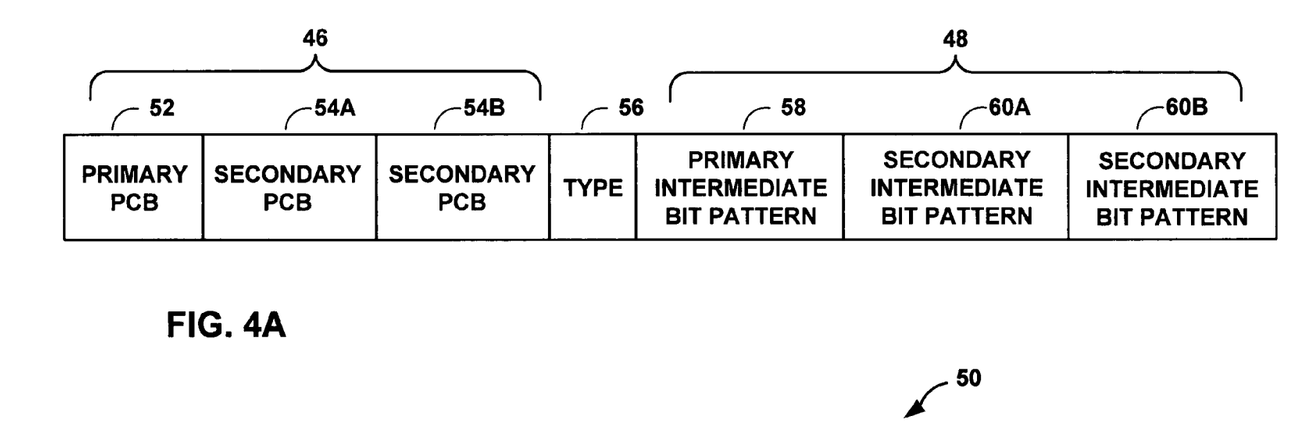
FIG. 4A is a block diagram illustrating an example data structure for an internal node of a forwarding tree.

FIG. 4A illustrates an example data structure 50 for an internal node 40. Data structure 50 may be a subset of forwarding information 32 that corresponds to an internal node 40, and may be located in memory 33 of packet-forwarding engine 26 (FIG. 2). Forwarding unit 34 may load part or all of a data structure 50 from memory 33 for each node traversed in radix tree 36. As will be explained in further detail below, data structure 50 is structured such that packet-forwarding engine 26 may test two or more bits of the key per traversed node based on the specified path control bits, thereby reducing the number of memory accesses required to resolve each packet to next hop. This may improve the efficiency of router 20.

Each data structure 50 may include path control bit fields 46 and intermediate bit pattern fields 48. A primary path control bit (PCB) field 52 that indicates one bit of the key to test, and two secondary path control bit fields 54A and 54B (collectively, secondary path control bit fields 54) that indicate other path control bits s0 and s1 of the key to test. For example, in one embodiment, secondary path control bit field 54A indicates which bit s0 of the key to test when the value of a bit in the key as indicated by primary path control bit 52 is a first value, e.g., "0." Secondary path control bit field 54B indicates which bit s1 of the key to test when the value of the bit in the key as indicated by primary path control bit 22 is a second value, e.g., "1."

In one embodiment, secondary path control bit fields 54 may be stored in terms of an offset from the bit indicated in primary path control bit field 52. A type field 56 indicates a type of node. For example, the type of node may be an internal node or a leaf node.

Primary intermediate bit pattern field 58 specifies a first set of intermediate bits within the key, and stores a bit pattern for comparison to the intermediate bits. These intermediate bits are compared with corresponding intermediate bits in the key. In one embodiment, the corresponding intermediate bits in the key are the bits to the left of the primary path control bit, i.e., the most significant, that have not been tested while processing a previous node. Secondary intermediate bit pattern fields 60A and 60B (collectively, secondary intermediate bit pattern fields 60) each store another bit pattern for comparison to other intermediate bits within the key, i.e., bits between the primary path control bit and the first secondary path control bit, and between the primary path control bit and the second secondary path control bit, respectively. Which of secondary intermediate bit pattern fields 60 may be used depends on the value of the bit indicated by primary path control bit 52. For example, in one embodiment, secondary intermediate bit pattern field 60A indicates intermediate bits of the key to test for equality when the value of a bit in the key as indicated by primary path control bit 52 is a first value, e.g., "0." Secondary intermediate bit pattern field 60B indicates intermediate bits of the key to test for equality when the value of a bit in the key as indicated by primary path control bit 22 is a second value, e.g., "1."

If the intermediate bits match the specified patterns, packet-forwarding engine 26 continues traversing the forwarding tree to identify a better match. If the intermediate bits do not match the specified patterns, packet-forwarding engine 26 stops traversing the forwarding tree, as described above, and forwards a packet according to the best next hop data found so far, for example, the next hop data 44 attached to the current internal node. In this manner, packet-forwarding engine 26 avoids potential backtracking in the forwarding tree. Packet-forwarding engine 26 need not traverse all the way to a leaf node to check the intermediate bits of the key and to select a route. Instead, at each node, packet-forwarding engine 26 evaluates the intermediate bits by comparison to the defined intermediate bit patterns 48 to determine whether a particular node is the best match to the routing prefix contained in the key, or forwarding tree 36 contains a better match by continuing traversing the forwarding tree. Thus, when generating forwarding tree 36, routing engine 24 generates intermediate bit patterns 48 for a given node to match those routes that better match child nodes. Thus, the intermediate bit patterns 48 provide a failure condition for routes that best match the current, internal node, thereby providing a termination condition for path traversal.

Although not shown, a node may include additional information, such as address information for locating child nodes in memory, and next hop data for identifying the next hop and selecting the corresponding output port. Furthermore, in one embodiment, three or more path control bits may be tested at each node. In this embodiment, each node may contain a primary path control bit, two secondary path control bits, and four tertiary path control bits. The intermediate bit patterns in this embodiment would include bits between the tested path control bits.

Figure 4B:
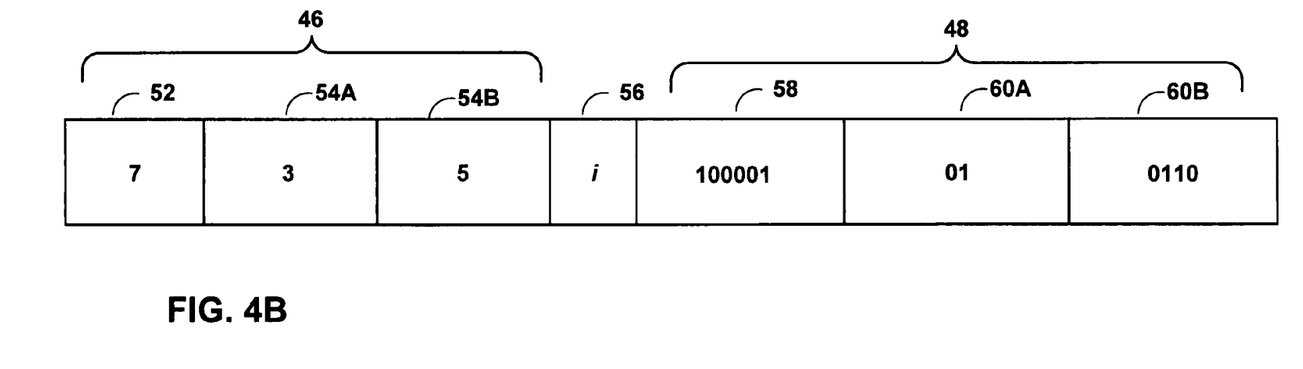
FIG. 4B is a block diagram illustrating the example data structure of FIG. 4A populated with exemplary data.

FIG. 4B is a block diagram illustrating the example data structure 50 of FIG. 4A populated with exemplary data. In this example, primary path control bit field 52 indicates that bit seven of the key should be tested. Secondary path control bits 54 are expressed in terms of an offset from primary path control bit 52. Secondary path control bit 54A indicates that if bit seven is "0," bit 7+3=10 should be tested. Secondary path control bit 54B indicates that if bit seven is "1," bit 7+5=12 should be tested. The primary and secondary bits to test may be limited to being within a certain distance from each other within the key, such as within 15 bits.

Type field 56 indicates a type i of the node. For example, a value of 0 for i may indicate the node is an internal node, while a value of 1 may indicate the node is a leaf node.

In this example, primary intermediate bit pattern field 58 contains six bits, 10001, that correspond to bits one through six of the key, i.e., the bits to the left of primary path control bit seven. Secondary intermediate bit pattern field 60A contains two bits, 01, that correspond to bits eight and nine of the key, i.e., those bits located between the primary path control bit 7 and the secondary path control bit 10. Secondary intermediate bit pattern field 60B contains four bits, 0110, that corresponds to bits eight through eleven of the key, i.e., the bits located between the primary path control bit 7 and the secondary path control bit 12.

Figure 5:
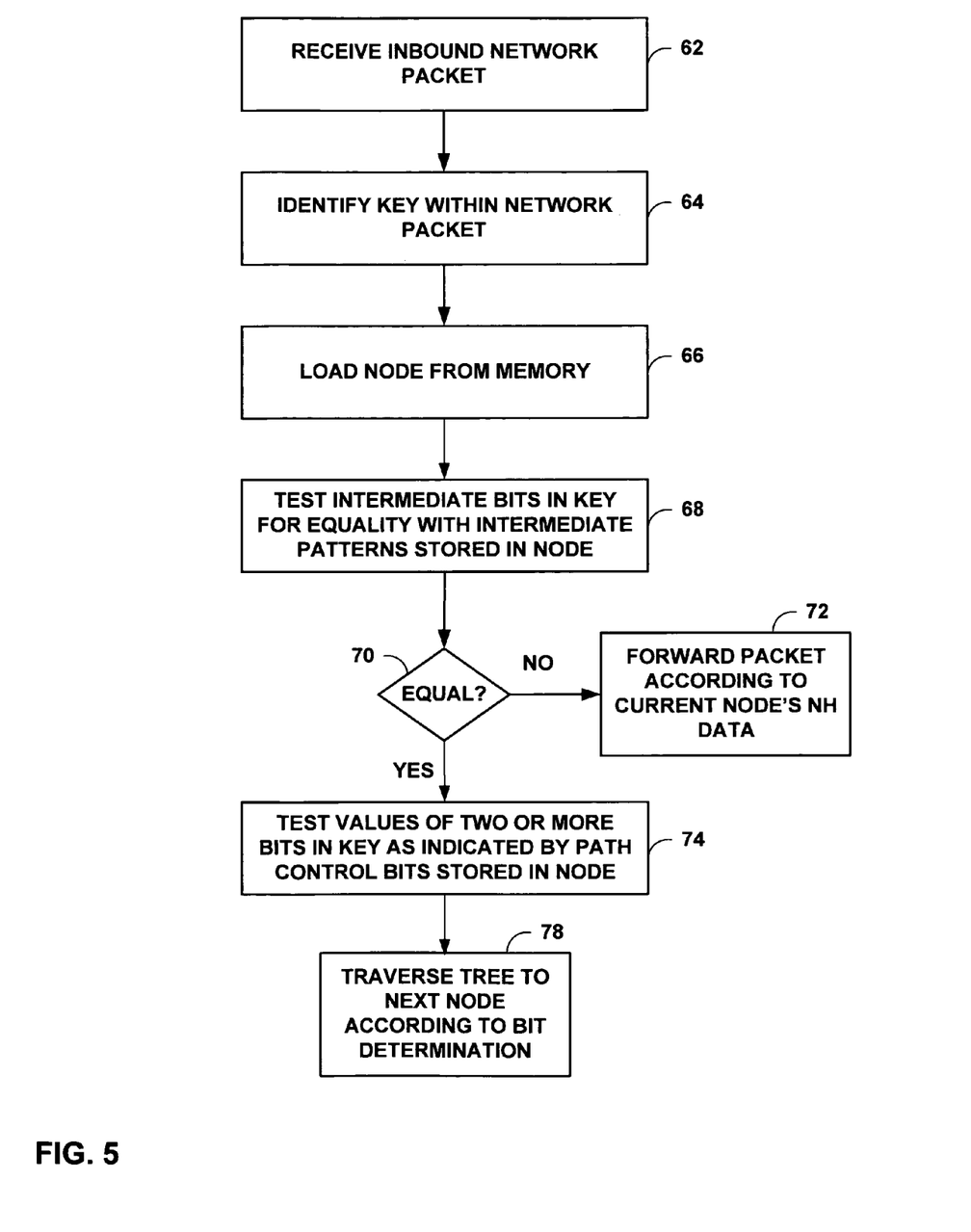
FIG. 5 is a flowchart illustrating an example operation of the router consistent with the principles of the invention.

FIG. 5 is a flowchart illustrating an example operation of router 20 consistent with the principles of the invention. For purpose of illustration, FIG. 5 is described with reference to FIGS. 2, 3, 4A and 4B and, in particular, router 20 of FIG. 2.

Upon receiving an inbound packet (62), router 20 identifies and reads a key within the packet (64). The key may identify a network address of a destination device within a network. In addition, the key may identify a type of packet being forwarded, e.g., an IP packet or an MPLS packet. In some embodiments, forwarding unit 32 selects a type of forwarding tree based on the type of packet being forwarded. In other words, router 20 may maintain one or more forwarding trees, and may utilize the appropriate tree based on the type of packet. Alternatively, a large forwarding tree may be formed from forwarding trees for different packet types, and each tree may in effect be a sub-tree of the larger forwarding tree.

Next, forwarding unit 32 accesses a starting address within memory 33 to retrieve a root node for the selected tree. Referring to FIG. 3, the root node may be, for example, internal node 40A. For purposes of illustration, it will be assumed in this example that bit A refers to bit 7, bit B refers to bit 10, and bit C refers to bit 12, as illustrated in the example of FIG. 4B.

Forwarding unit 32 loads a data structure containing node data associated with internal node 40A from memory 33 (66). The node data may include pointers, path control bits, intermediate patterns, and next hop data. Forwarding unit 32 may load a single node per memory access, or may load multiple nodes depending on the data width of memory 32. Moreover, forwarding unit 32 may employ caching schemes to prefetch nodes from memory 32 based on current results from bit comparisons at any given node.

The loaded internal node 40A may comprise a data structure similar to data structure 50 (FIG. 4B). Packet-forwarding engine 26 then tests intermediate bits in the key for equality with intermediate bit patterns 46 stored in node 40A (68). As described above, intermediate patterns field 58 specifies defined patterns for certain ranges of intermediate bits to the left of primary path control bit 52. Packet-forwarding engine 26 compares these patterns with the actual values of intermediate bits within the current key. For example, assuming the primary path control bit field 52 specifies bit 7, primary intermediate bit pattern field 58 may indicate that bits 1-6 have a certain bit pattern, such as "100001." Further, assuming secondary path control bits are specified as bits 10 and 12, secondary intermediate bit pattern field 60A may further specify a bit pattern for intermediate bits 8-9, such as "01," and secondary intermediate bit pattern field 60B may specify a bit pattern for intermediate bits 8-11, such as "1010." Thus, for a given internal node, intermediate patterns fields 48 specify bit patterns for those bits ranging from a starting bit (bit 0 in this case) to the highest secondary path control bit (bit 12 in this case). For lower-level internal nodes, the intermediate patterns field specifies bit patterns starting at the highest secondary path control bit of the parent node and ranging to the highest secondary path control bit of that lower-level node.

Packet-forwarding engine 26 tests intermediate bits in the key and compares their values with the bit patterns indicated by intermediate bit patterns fields 48. If the values of the bits in the key are not equal to the values specified in intermediate patterns field 48 (70), packet-forwarding engine 26 stops traversing the forwarding tree, and forwards the packet according to next hop data 44 contained in the node that is currently being evaluated (72). In this way, the next hop data 44 provides a default path in the event no better (i.e., longer) match is located in the forwarding tree for a particular key. If there are not enough bits in the intermediate bit pattern fields 48 to represent all of the intermediate bits associated with the node, the forwarding tree may require insertion of a new node, which may require another memory access. This may occur, for example, where the primary and secondary path control bits are far apart; as a result, the number of intermediate bits between them is greater.

If the values of the bits in the key are equal to the values of the bits in intermediate patterns field 58 (72), packet-forwarding engine 26 then tests the values of two or more bits in the key in accordance with path control bits 46, e.g., primary path control bit 52 and one of secondary path control bits 54 (74). For example, in one embodiment, packet-forwarding engine 26 tests the value of the bit in the key indicated by the primary path control bit 52 associated with internal node 40A. Packet-forwarding engine 26 then tests the value of a second bit in the key, as indicated by secondary path control bit fields 54 of internal node 40A.

As described above, in one embodiment, whether secondary path control bit field 54A or 54B is used to control path traversal depends on the result of testing the bit indicated by primary path control bit 52. For example, primary path control bit field 52 may indicate that bit 7 of the key is to be tested. Secondary path control bit field 54A may indicate that bit 10 is to be tested if the value of bit 7 is "0," and secondary path control bit field 54B may indicate to test bit 12 if the value of bit 7 is "1." Secondary bit-to-test indicator fields 54 may be expressed in terms of offsets of the value expressed in primary path control bit field 52.

Packet-forwarding engine 26 then continues traversing the forwarding tree to the next node according to the tested path control bit values (78). If the next node is a leaf node, packet-forwarding engine 26 will forward the packet according to the next hop data 44 contained in the leaf node.

In this manner, packet-forwarding engine 26 avoids potential backtracking in the forwarding tree. Packet-forwarding engine 26 need not traverse all the way to a leaf node to check the intermediate bits of the key and to select a route. Instead, at each node, packet-forwarding engine 26 evaluates the intermediate bits to determine whether a particular node is the best match to the routing prefix contained in the key, or whether packet-forwarding engine 26 may find a better match by continuing to traverse the forwarding tree.

Figure 6:
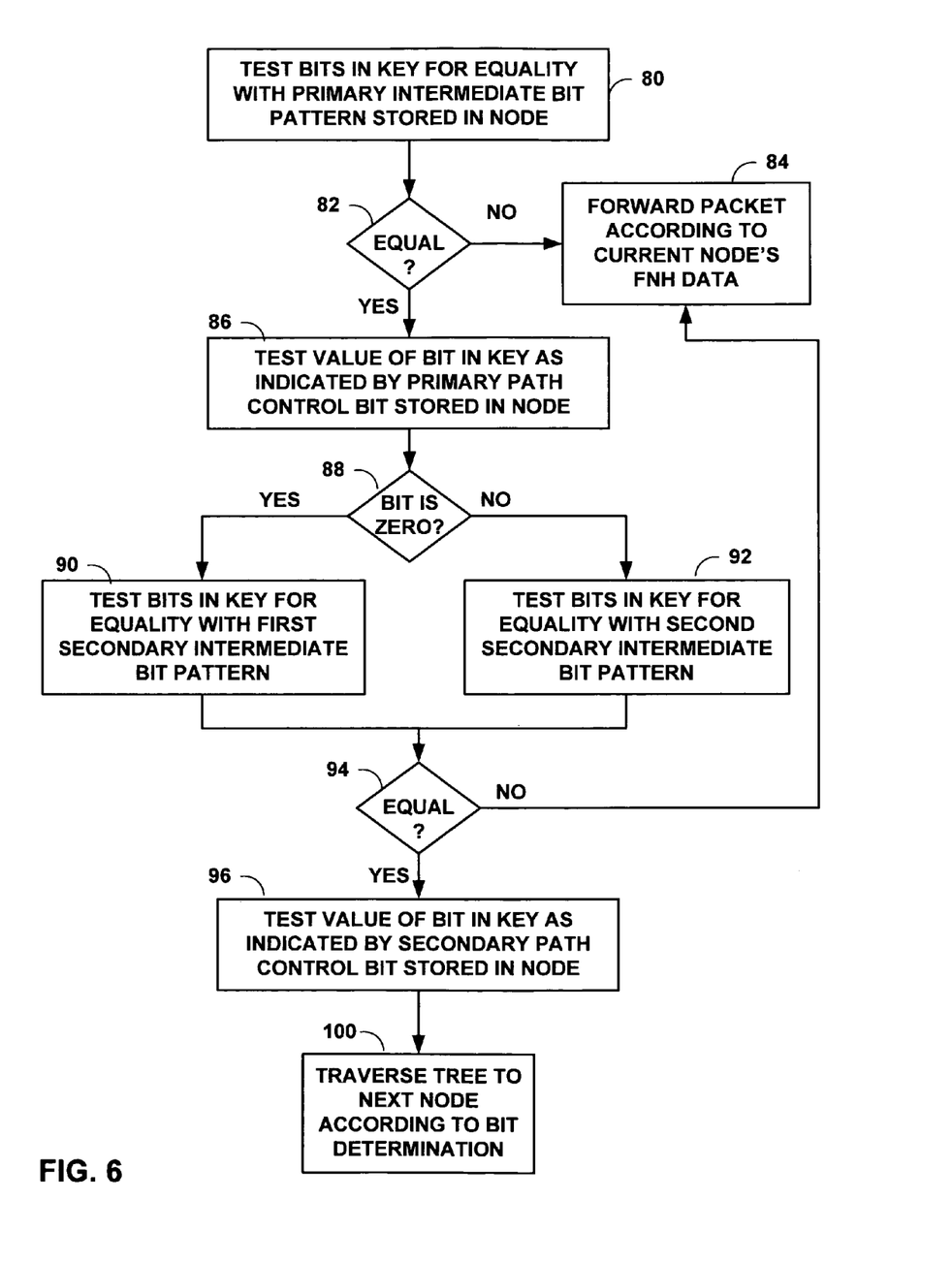
FIG. 6 is a flowchart illustrating operation of the router in further detail.

FIG. 6 is a flowchart illustrating example operation of router 20 in further detail when testing intermediate bit patterns fields 48 and path control bits 46 for a current node. In this embodiment, packet-forwarding engine 26 may test primary intermediate bit pattern 58, then test primary path control bit 52, then based on the value of the tested primary path control bit 52, may test only one of secondary intermediate bit pattern 60A or 60B.

As preliminary steps, router 20 may receive a packet, identify a key, and load a node from memory as described above with FIG. 5. Then packet-forwarding engine 26 tests a primary group of bits in the key for equality with primary intermediate bit pattern 58 stored in the node (e.g., bits 1-6) (80). If the bits in the key are not equal to the bits in the pattern (82), router 20 stops traversing the forwarding tree and forwards the packet according the forwarding next hop data associated with the current node (84). In this case, router 20 has determined that no better match is located in the forwarding tree for this particular key.

If the bits in the key are equal to the bits in the pattern (82), then packet-forwarding engine 26 tests a bit in the key as indicated by primary path control bit 52, e.g., bit 7 (86). If bit 7 is zero (88), packet-forwarding engine 26 tests bits in the key corresponding to secondary intermediate bit pattern 60A, e.g., bits 8 and 9 (90). If the bit 7 is one, i.e., not zero (88), packet-forwarding engine 26 tests bits in the key corresponding to secondary intermediate bit pattern 60B, e.g., bit 11 (92). If the tested bits in the key are not equal to the respective secondary intermediate bit pattern (94), router 20 stops traversing the forwarding tree and forwards the packet according the forwarding next hop data associated with that node (84). In this case, router 20 has determined that no better match is located in the forwarding tree for this particular key.

If the bits in the key are equal to the bits in the pattern (94), then packet-forwarding engine 26 tests a bit in the key as indicated by one of secondary path control bits 54, e.g., bit 10 or bit 12, depending on whether bit 7 was zero or one (96). Packet-forwarding engine 26 continues traversing the forwarding tree to the next node according to the tested path control bit values (100). In the example of FIG. 3, if bit 7 is zero and bit 10 is zero, packet-forwarding engine 26 will go to leaf node 42A. If bit 7 is one and bit 10 is zero, packet-forwarding engine 26 will go to internal node 40B. If bit 7 is zero and bit 10 is one, packet-forwarding engine 26 will go to leaf node 42B, and if bit 7 is one and bit 10 is one, packet-forwarding engine 26 will go to leaf node 42C. In this manner, packet-forwarding engine traverses forwarding tree 36 to determine the longest match for the routing prefix of the packet key.

Various embodiments of the invention have been described. These and other embodiments are within the scope of the following claims.

The invention claimed is:

1. A method comprising:
    identifying a key within a network packet;
    traversing nodes of a forwarding tree within a network device by testing two or more path control bits within the key per each of the traversed nodes, wherein values of the two or more path control bits in the key determine a path traversed along the tree, wherein each of the traversed nodes specifies a primary path control bit and at least two secondary path control bits in accordance with a hierarchy defined by the forwarding tree, wherein the value of the primary path control bit determines which of the at least two secondary path control bits to test within the key, and wherein each of the secondary path control bits is expressed as an offset from the primary path control bit; and
    taking an action on the packet based on next hop data associated with an end node of the traversed path.

2. The method of claim 1,
    wherein each of the traversed nodes stores data specifying a pattern, and
    wherein traversing the nodes of the tree further comprises testing one or more bits of the key in addition to the path control bits for equality to the pattern.

3. The method of claim 2, wherein the pattern indicates whether subsequent nodes of the forwarding tree provide a better match for the key relative to a current node being traversed.

4. The method of claim 2, further comprising terminating the traversal of the forwarding tree at an internal node when the pattern fails to match the bits of the key.

5. The method of claim 1, wherein traversing nodes of a forwarding tree comprises testing three or more path control bits within the key per each of the traversed nodes, wherein values of the three or more path control bits in the key determine a path traversed along the tree.

6. A method comprising:
    identifying a key within a network packet;
    traversing nodes of a forwarding tree within a network device by
    testing a primary path control bit, testing at least one of two secondary path control bits, and testing at least one of the four tertiary path control bits, per each of the traversed nodes, wherein values of the primary path control bits, the secondary path control bits, and the tertiary path control bits in the key determine a path traversed along the tree; and
    taking an action on the packet based on next hop data associated with an end node of the traversed path.

7. The method of claim 6,
    wherein each of the traversed nodes stores data specifying a pattern, wherein traversing the nodes comprises testing one or more bits of the key in addition to the path control bits for equality to the pattern, and wherein the one or more bits include bits surrounding the primary path control bit, the secondary path control bits, and the tertiary path control bits.

8. The method of claim 1, wherein taking an action on the packet comprises forwarding the packet according to the next hop data.

9. The method of claim 1, wherein taking an action on the packet:

accessing the next hop data associated with the end node to select a next hop; and forwarding the packet to an output port based on the selected next hop.

10. The method of claim 1, wherein the end node is a leaf node.

11. The method of claim 1, wherein the end node is an internal node.

12. The method of claim 1, wherein traversing the nodes of the forwarding tree comprises:

testing a bit of the key corresponding to the specified primary path control bit; and testing a bit of the key corresponding to the specified secondary path control bit when the bit corresponding to the primary control bit is zero.

13. The method of claim 12, wherein each node comprises a plurality of secondary path control bits.

14. A method comprising:

identifying a key within a network packet;

traversing nodes of a forwarding tree within a network device, wherein each of the nodes specifies a primary path control bit, and at least one secondary path control bit, wherein the secondary path control bit is expressed as an offset from the primary path control bit, and wherein traversing the nodes of the forwarding tree comprises:

testing a bit of the key corresponding to the specified primary path control bit; and testing a bit of the key corresponding to the specified secondary path control bit when the bit corresponding to the primary control bit is zero.

15. The method of claim 1, wherein each node includes a type field that indicates a type of the node.

16. The method of claim 1, further comprising storing the forwarding information in the form of a radix tree.

17. The method of claim 16, further comprising storing the radix tree in the form of one of more tables or link lists.

18. The method of claim 1, wherein each of the traversed nodes specifies a primary path control bit and at least two secondary path control bits s0 and s1, and wherein traversing nodes of the forwarding tree comprises:

testing a bit of the key corresponding to the specified primary path control bit;

testing a bit of the key corresponding to the specified secondary path control bit s0 when the bit corresponding to the primary control bit is zero; and testing a bit of the key corresponding to the specified secondary path control bit s1 when the bit corresponding to the primary control bit is one.

19. A method comprising:

identifying a key within a network packet;

traversing nodes of a forwarding tree within a network device, wherein each of the traversed nodes specifies a primary path control bit and at least two secondary path control bits s0 and s1, wherein each of the secondary path control bits is expressed as an offset from the primary path control bit, and wherein traversing nodes of the forwarding tree comprises:

testing a bit of the key corresponding to the specified primary path control bit;

testing a bit of the key corresponding to the specified secondary path control bit s0 when the bit corresponding to the primary control bit is zero; and testing a bit of the key corresponding to the specified secondary path control bit s1 when the bit corresponding to the primary control bit is one.

20. A device comprising:

an input port for receiving a network packet containing a key;

a packet-forwarding engine that traverses nodes of a forwarding tree by testing two or more path control bits in the key per each of the traversed nodes, wherein values of the two or more path control bits in the key determine a path traversed along the tree, wherein each of the traversed nodes specifies a primary path control bit and at least two secondary path control bits in accordance with a hierarchy defined by the forwarding tree, wherein the value of the primary path control bit determines which of the at least two secondary path control bits to test within the key, and wherein each of the secondary path control bits is expressed as an offset from the primary path control bit; and one or more output ports for forwarding the packet according to a forwarding next hop associated with an end node of the traversed path.

21. The device of claim 20, wherein each of the traversed nodes stores data specifying a pattern, and wherein the packet-forwarding engine tests one or more bits of the key other than the path control bits for equality to the pattern.

22. The device of claim 21, wherein the pattern indicates whether subsequent nodes of the forwarding tree provide a better match for the key relative to a current node being traversed.

23. The device of claim 21, wherein the packet-forwarding engine terminates the traversal of the forwarding tree at an internal node when the pattern fails to match the bits of the key.

24. The device of claim 20, wherein the packet-forwarding engine:

accesses next hop data associated with the end node to select the next hop, and forwards the packet to one of the output ports based on the selected next hop.

25. The device of claim 20, wherein the end node is a leaf node.

26. The device of claim 20, wherein the end node is an internal node.

27. The device of claim 20, wherein the packet-forwarding engine:

tests a bit of the key corresponding to the specified primary path control bit; and tests a bit of the key corresponding to the specified secondary path control bit when the bit corresponding to the primary control bit is zero.

28. The device of claim 20, wherein each node includes a type field that indicates a type of the node.

29. The device of claim 20, wherein the device comprises a network router.

30. The device of claim 20, wherein the device comprises a firewall, a session border controller, or a virtual private network (VPN) device.

31. The device of claim 20, wherein the forwarding tree comprises a radix tree.

32. The device of claim 20, wherein the forwarding tree comprises a table or a link list.

33. A computer-readable medium comprising instructors for causing a programmable processor to:
identify a key within a network packet;
traverse nodes of a forwarding tree within a network packet by testing two or more path control bits within the key per each of the traversed nodes, wherein values of the two or more path control bits in the key determine a path traversed along the tree, wherein each of the traversed nodes specifies a primary path control bit and at least two secondary path control bits in accordance with a hierarchy defined by the forwarding tree, wherein the value of the primary path control bit determines which of the at least two secondary path control bits to test within the key, and wherein each of the secondary path control bits is expressed as an offset from the primary path control bit; and
forward the packet according to a forwarding next hop associated with an end node of the traversed path.

34. The computer-readable medium of claim 33,
wherein each of the traversed nodes stores data specifying a pattern, and
wherein the instructions cause the processor to test one or more intermediate bits of the key other than the path control bits for equality to the pattern.

* * * * *

UNITED STATES PATENT AND TRADEMARK OFFICE
CERTIFICATE OF CORRECTION

| | | |
|---|---|---|
| PATENT NO. | : 7,512,080 B1 | Page 1 of 1 |
| APPLICATION NO. | : 11/305847 | |
| DATED | : March 31, 2009 | |
| INVENTOR(S) | : Kompella et al. | |

It is certified that error appears in the above-identified patent and that said Letters Patent is hereby corrected as shown below:

Column 12, line 56 (Claim 6), "at least one of the" should be -- at least one of --

Column 13, lines 10-11 (Claim 9), "action on the packet:" should be -- action on the packet comprises: --

Column 13, line 49 (Claim 17), "in the form of one of more" should be -- in the form of one or more --

Column 15, line 8 (Claim 33), "comprising instructors" should be -- comprising instructions --

Signed and Sealed this
Fourteenth Day of August, 2012

David J. Kappos
*Director of the United States Patent and Trademark Office*